(12) United States Patent
Mickael et al.

(10) Patent No.: US 8,279,713 B2
(45) Date of Patent: Oct. 2, 2012

(54) ACOUSTIC TRANSMITTER COMPRISING A PLURALITY OF PIEZOELECTRIC PLATES

(75) Inventors: Medhat W. Mickael, Sugar Land, TX (US); Dale A. Jones, Houston, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 1442 days.

(21) Appl. No.: 11/780,957

(22) Filed: Jul. 20, 2007

(65) Prior Publication Data

US 2009/0022011 A1    Jan. 22, 2009

(51) Int. Cl.
*H04R 17/00* (2006.01)
(52) U.S. Cl. .......................... 367/157; 367/155; 367/25
(58) Field of Classification Search .................. 181/106, 181/119; 310/332, 334, 337, 369; 367/25, 367/157, 159–161, 163, 166
See application file for complete search history.

(56) References Cited

U.S. PATENT DOCUMENTS

| | | | |
|---|---|---|---|
| 4,245,172 A * | 1/1981 | Shirley ........................ | 310/332 |
| 4,450,540 A | 5/1984 | Mallett | |
| 4,525,645 A * | 6/1985 | Shirley et al. ................ | 310/337 |
| 4,682,308 A | 7/1987 | Chung | |
| 5,043,952 A | 8/1991 | Hoyle et al. | |
| 5,063,542 A * | 11/1991 | Petermann et al. ........... | 367/166 |
| 5,387,767 A | 2/1995 | Aron et al. | |
| 5,644,186 A | 7/1997 | Birchak et al. | |
| 5,753,812 A | 5/1998 | Aron et al. | |
| 6,102,152 A | 8/2000 | Masino et al. | |
| 6,147,932 A | 11/2000 | Drumheller | |
| 6,213,250 B1 | 4/2001 | Wisniewski et al. | |
| 6,631,327 B2 | 10/2003 | Hsu et al. | |
| 6,697,298 B1 | 2/2004 | Dubinsky et al. | |
| 7,207,397 B2 | 4/2007 | Miyamoto et al. | |
| 2006/0209635 A1 * | 9/2006 | Geerits et al. ................. | 367/25 |

FOREIGN PATENT DOCUMENTS

EP    0679910 A2    2/1995

OTHER PUBLICATIONS

UK Intellectual Property Office Patents Act 1977 Combined Search and Examination Report under Sections 17 & 18 (3), dated Oct. 15, 2008.

* cited by examiner

*Primary Examiner* — Isam Alsomiri
*Assistant Examiner* — Daniel L Murphy
(74) *Attorney, Agent, or Firm* — Wong, Cabello, Lutsch, Rutherford & Brucculeri, L.L.P.

(57) ABSTRACT

An acoustic transmitter with preferably a plurality of piezoelectric plates configured to optimized acoustic pressure output within a desired frequency range while meeting physical restrictions of LWD and MWD logging systems. The transmitter is disposed in a recess in the perimeter of a logging tool housing to reduce acoustic pressure waves transmitted directly along the tool housing and to optimize acoustic energy transmission into the borehole environs. In order to increase acoustic pressure output at a desired logging frequency range, the plurality of piezoelectric plates are connected electrically in parallel and fired simultaneously. The polarity of the plates and the wiring arrangement are such that each plate expands or contracts in a common direction during simultaneous firing by an applied voltage. The desired output frequency is obtained by selectively polarizing and dimensioning the plates within the plate assembly. The plate assembly is preferably disposed within an oil filled pressure housing that is pressure and temperature compensated.

22 Claims, 3 Drawing Sheets

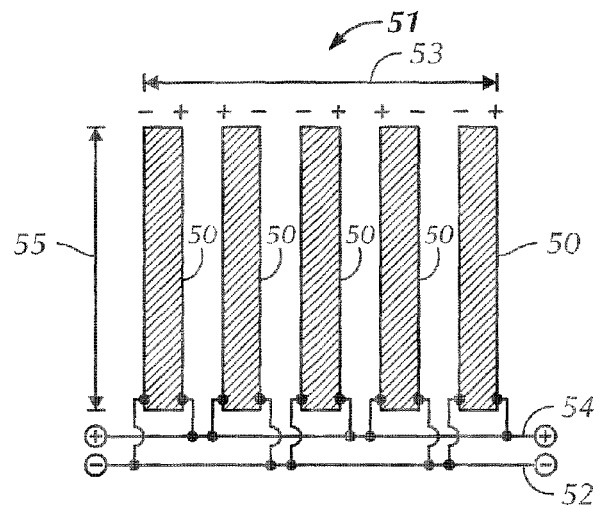
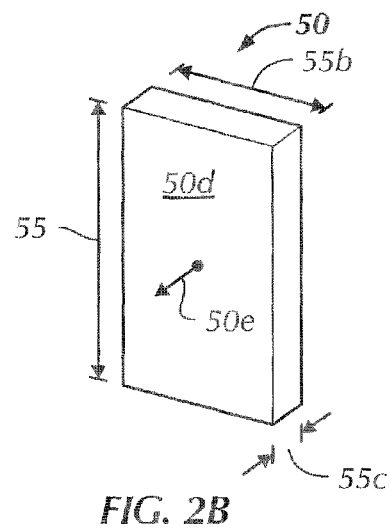
FIG. 2A              FIG. 2B
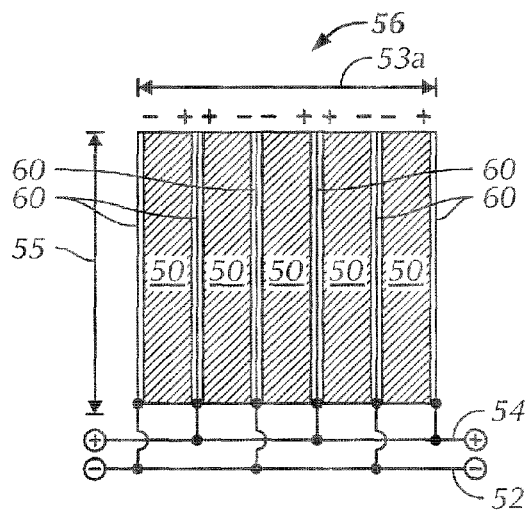
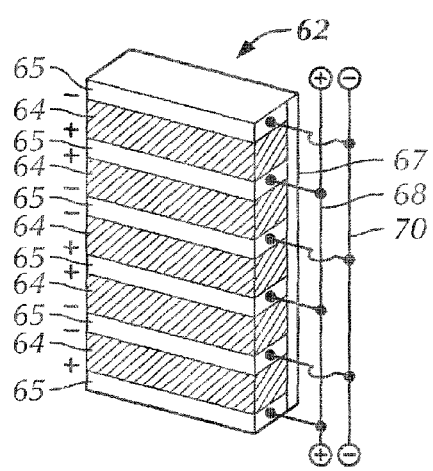
FIG. 3              FIG. 4

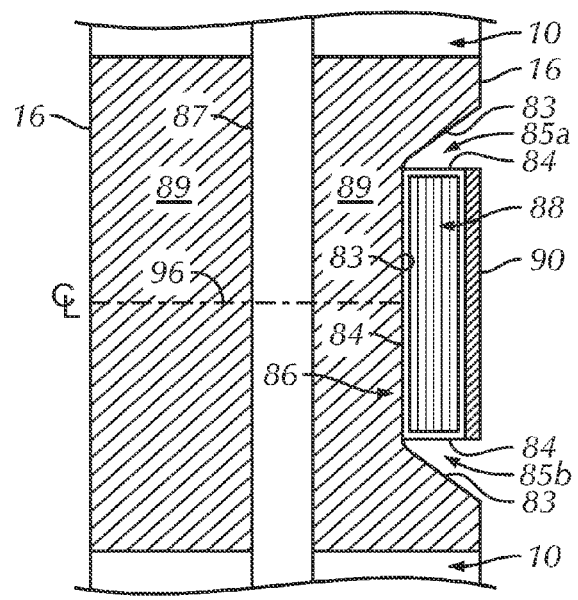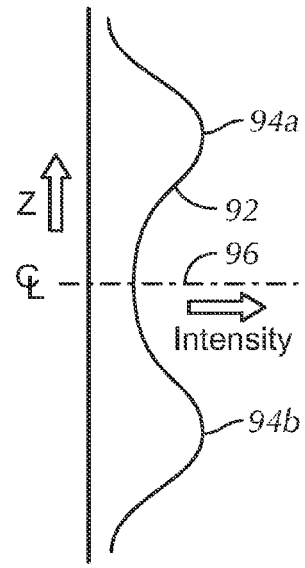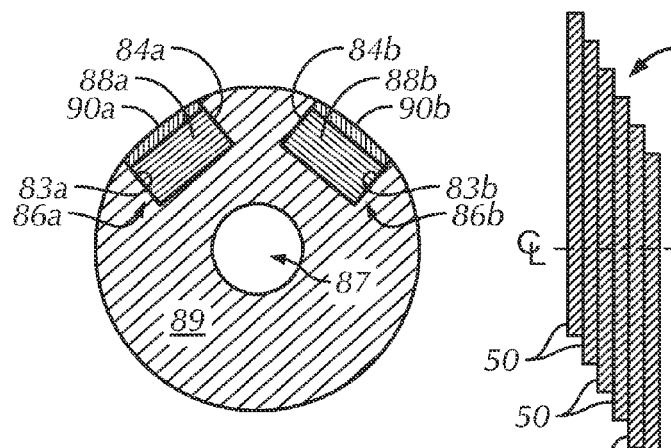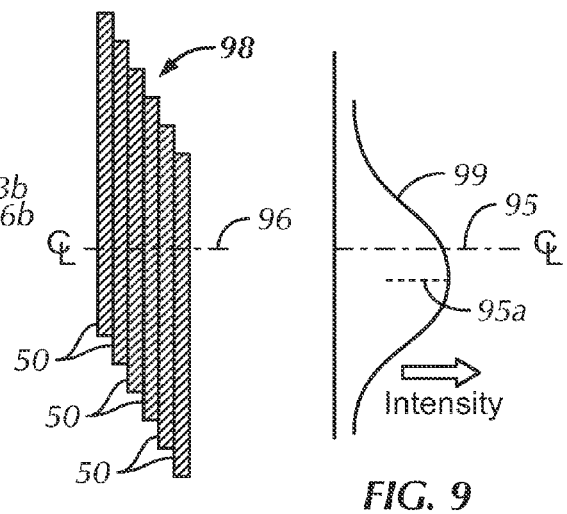
FIG. 5
FIG. 7
FIG. 6
FIG. 8
FIG. 9

ACOUSTIC TRANSMITTER COMPRISING A PLURALITY OF PIEZOELECTRIC PLATES

FIELD OF THE INVENTION

This invention is related to systems for measuring an acoustic property of material penetrated by a well borehole. More particularly, the invention is related to improved acoustic transmitters for use with acoustic logging-while-drilling (LWD) or measurement-while-drilling (MWD) borehole assemblies.

BACKGROUND

Acoustic logging systems are routinely used in the oil and gas industry to measure formation acoustic properties of earth formation penetrated by a well borehole. These properties include the compressional and shear velocities of the formation, which are subsequently used to determine a variety of formation parameters of interest such as porosity and pore pressure. Additionally, acoustic logging systems are used to produce acoustic images of the borehole from which well conditions and other geological features can be investigated. Other applications of acoustic logging measurements include seismic correlation and rock mechanic determination.

The downhole instrument or borehole "tool" of an acoustic logging system typically comprises one or more sources of acoustic pressure or "transmitters", and one or more acoustic receivers. The transmitters and receivers are typically spaced axially on the body of the tool. Multiple transmitters and/or receivers can also be disposed at different radial positions around the tool. A portion of the energy emitted by the one or more transmitters propagates through formation material surrounding the borehole, and is subsequently detected by the one or more receivers. Receiver response is then used to determine properties and parameters of interest.

Frequencies used in acoustic LWD tools are typically within the 2 to 20 kiloHertz (KHz) range. In order to improve accuracy and precision of measured acoustic information; it is desirable to employ one or more transmitters that have the highest acoustic pressure output at the desired frequency.

Logging-while-drilling (LWD) and measurement-while-drilling (MWD) tools impose severe limitations that affect the energy and frequency output of an acoustic transmitter disposed within the wall of the tool and operating at a desired frequency. Some of these limitations are discussed briefly in the following paragraphs.

If the transmitter comprises piezoelectric crystals, the acoustic pressure output of an acoustic transmitter is proportional to the surface area of the transmitting element. In order to maximize the amount of energy reaching the borehole environs and minimize the propagation of acoustic energy along the tool, it is preferred to dispose the transmitter as near as possible to the outer periphery of the tool. It is, therefore, desirable to dispose the transmitter within a recess in the outer surface of the tool housing wall. An LWD tool housing is typically a drill collar. For structural reasons, it is necessary to restrict the depth, azimuthal and axial dimensions of any recess in the tool wall. These structural recess restrictions therefore govern the maximum dimensions of a transmitter that can disposed within the wall of an LWD tool and, therefore, restrict the acoustic energy output of the transmitter.

The frequency of a piezoelectric crystal element is a function of the geometry of the crystal element. Stated another way, the dimensions of a piezoelectric crystal transmitter determine the frequency output of the transmitter. Considering the discussion in the previous paragraph, a transmitter configured to optimize acoustic energy output within tool structural restrictions may not be configured to obtain the desired frequency output requirements. Conversely, a piezoelectric crystal dimensioned to achieve the desired frequency output may limit the acoustic energy output of the transmitter.

In summary, the transmitter must be configured to operate within a tool in harsh borehole conditions. Structure required to operationally dispose the transmitter within the wall of the tool imposes additional transmitter dimensional restrictions that, in turn, affect energy and frequency output of the transmitter.

In view of the brief background discussion, there is a need for a transmitter with optimized acoustic pressure output, with output frequency optimized to fall within a desired frequency range, and with a physical configuration suitable to meet structural restrictions of LWD and MWD logging systems.

SUMMARY OF THE INVENTION

The invention is an acoustic transmitter comprising one or more piezoelectric plates. Details of the invention are presented with the transmitter embodied as a monopole transmitter. The basic concepts of the invention can also be embodied as a monopole, dipole, or a quadrupole transmitter by changing the polarity and sequence of firing of the transmitter.

The transmitter comprising a plate assembly having preferably a plurality of plates that are configured to optimized acoustic pressure output within a predetermined center frequency range while meeting physical restrictions of LWD and MWD logging systems. The transmitter is disposed on the perimeter of a logging tool housing to reduce acoustic pressure waves transmitted directly along the tool housing and to optimize acoustic energy transmission into the borehole environs. Acoustic energy that propagates from the transmitter and directly along the logging tool housing is typically referred to as the "tool mode signal". The logging tool housing is typically a steel drill collar.

For purposes of discussion, it is assumed that the piezoelectric plates are rectangular with the largest "length" and "width" dimensions defining the "major" surface of the plate, and the "thickness" being the smallest dimension. A piezoelectric plate has three natural frequencies that are proportional to the three dimensions of the plate. A frequency in the desired range for acoustic logging typically corresponds to the longest dimension or "length" of the plate. This dimension is adjusted to obtain the desired transmitter frequency output. The configuration of any LWD or MWD logging tool housing is structurally restricted, as mentioned briefly in the BACKGROUND section of this disclosure. The dimensions of the plate must, therefore, be sufficiently restricted in size as not to jeopardize the mechanical strength of an acoustic LWD or MWD logging tool housing. The acoustic pressure output of a size restricted single plate in the desired frequency range is relatively low. In order to increase acoustic pressure output at a desired logging frequency range, the preferred transmitter comprises a plurality of piezoelectric plates connected electrically in parallel and fired simultaneously. Polarity of the plates and the wiring is such that each plate expands or contracts in the same direction during simultaneous firing. The plates can be embodied in one or more plate assemblies thereby forming the transmitter. Within a plate assembly, the plates can be placed side by side or alternately bonded together. In either configuration, the major surfaces of all plates in a plate assembly are parallel. The bonded plates provide the same acoustic output with a thinner plate assembly. By increasing acoustic pressure output at a desired frequency, multiple plate transmitter assembly maximizes the precision of measured acoustic parameters of interest. The one or more plate assemblies comprising a transmitter are each disposed in a pressure compensated housing preferably filled with oil.

The piezoelectric plates can be polarized along the thickness or the length of the plate. If polarized along the thickness, the desired length mode emission is obtained through the shrinkage in length as the thickness expands, which is not efficient. If the plate is polarized in the length mode, the desired frequency is obtained through the primary length mode. However, since it is difficult to polarize a long plate along its length, a striped plate may be used to obtain greater output efficiency than that of a thickness mode plate. As with the single piezoelectric crystal solid plates, the striped plates can be placed side by side, or alternately bonded together to form a plate assembly. Although offering advantages, the striped plates have some disadvantages compared to solid thickness mode plates. First, the output of a thickness mode plate is inversely proportional to its thickness while the output of a striped plate is a function of the stripe thickness and number of stripes. If the thickness of the plate is minimized to utilize more plates in a single plate assembly, the thickness mode plates may produce higher output than striped plates for a given assembly thickness. Second, it is easier to bond solid plates along their faces than to bond striped plates at their piezoelectric elements. Third, the signal directionality of the thickness mode plates is perpendicular to the face of the plate, which is more suitable for LWD logging applications.

In summary, thickness mode and striped plates both offer certain advantages and disadvantages that must be weighed considering the overall performance objectives of the acoustic transmitter.

Using any of the geometric embodiments briefly described above, a transmitter comprising the pressure chamber housing a plate assembly is disposed in a recess in the outer surface of the tool housing. Plates comprising a transmitter, whether comprising a single plate assembly or multiple plate assemblies, are oriented so that a normal to the major surface of each plate is essentially coincident with the radius of the tool housing. The one or more plate assemblies are acoustically coupled to fluid within the well borehole. In order to further increase acoustic pressure output of a transmitter, two or more plate assemblies and cooperating pressure housings can be disposed in two or more recesses in the outer surface of the tool housing.

BRIEF DESCRIPTION OF THE DRAWINGS

The manner in which the above recited features and advantages, briefly summarized above, are obtained can be understood in detail by reference to the embodiments illustrated in the appended drawings.

FIG. 2a is a cross-sectional view of a plate assembly comprising five piezoelectric plates 50 in a side-by-side configuration;

FIG. 2b is a perspective view of a single plate;

FIG. 3 illustrates a plate assembly 56 again comprising five bonded piezoelectric plates;

FIG. 4 illustrates a striped plate comprising a plurality of piezoelectric segments;

FIG. 5 is a cross-sectional view of a logging tool transmitter section showing a transmitter disposed within the tool section wall;

FIG. 6 is a cross-sectional view of a transmitter section showing two transmitters disposed in two axially aligned recesses in the wall of the transmitter section;

FIG. 7 conceptually illustrates the axial intensity distribution of the pressure output signal from the transmitter depicted in FIG. 5;

FIG. 8 is a cross-sectional illustration of a plate assembly with axially staggered plates; and FIG. 9 conceptually illustrates the axial intensity distribution of the pressure output signal from the transmitter using the staggered plate assembly depicted in FIG. 8

DETAILED DESCRIPTION OF THE PREFERRED EMBODIMENTS

Figure 1:
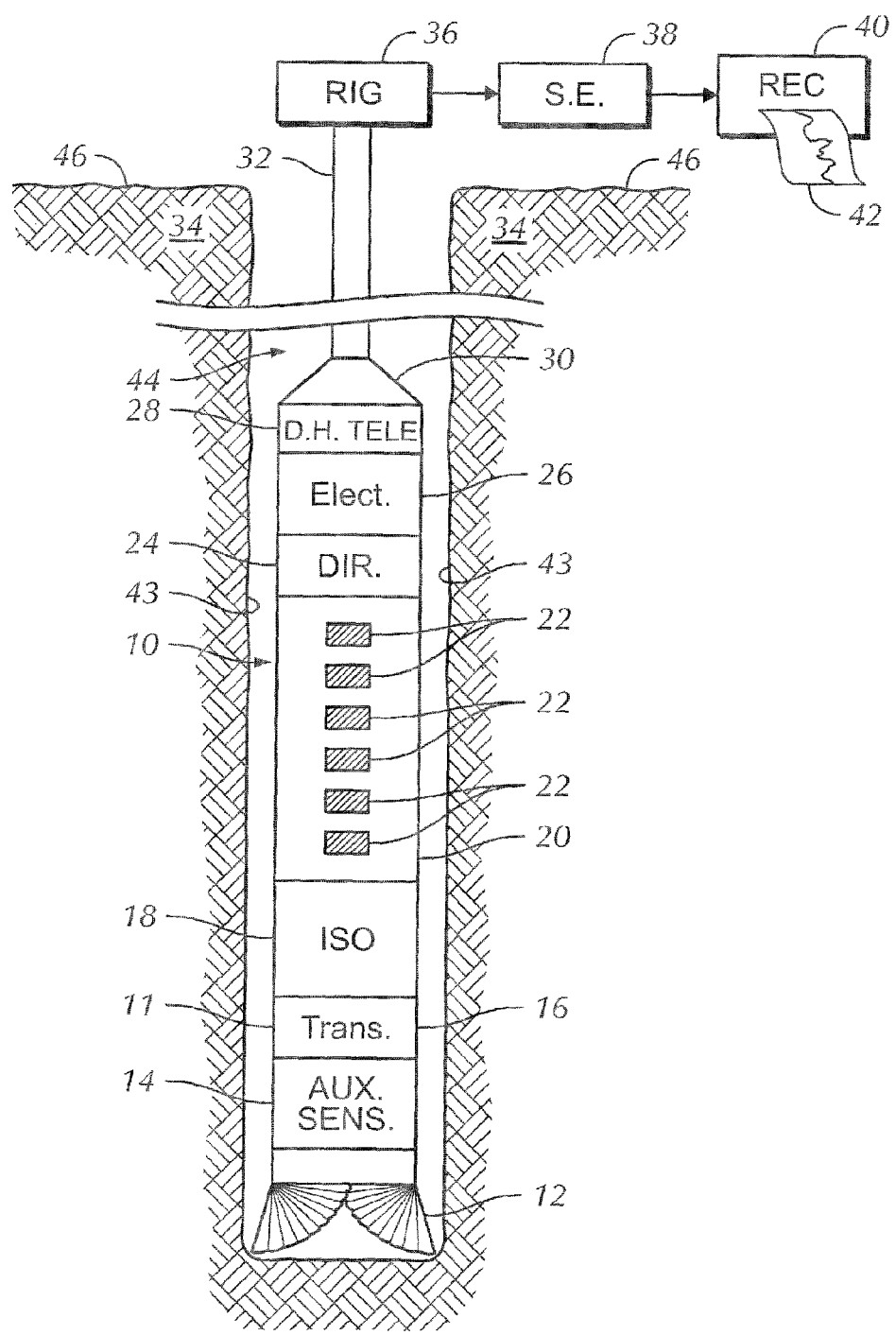
FIG. 1 illustrates the invention embodied as an LWD acoustic system disposed in a borehole drilling environment.

An acoustic LWD logging tool typically comprises one or more acoustic transmitters and one or more acoustic receivers.

FIG. 1 illustrates a single acoustic transmitter embodied as an LWD acoustic system disposed in a borehole drilling environment. Details of the transmitter are presented with the transmitter embodied as a monopole transmitter. The basic concepts of the used in the transmitter can also be embodied as a dipole or a quadrupole transmitter. The LWD borehole instrument or "tool" component of the borehole assembly is designated as a whole by the numeral 10, and comprises a pressure housing 11 which is typically a drill collar. The tool 10 is disposed within a well borehole 44 defined by borehole walls 43 and penetrating earth formation 34. A drill bit 12 terminates a lower end of the tool 10, and a connector 30 terminates an upper end of the tool. The connector 30 operationally connects the tool 10 to a lower end of a drill string 32. The upper end of the drill string terminates at a rotary drilling rig 36, which is known in the art and is illustrated conceptually at 36.

Again referring to FIG. 1, the tool 10 comprises a transmitter section 16 and a receiver section 20. An acoustic isolation section 18, which reduces the tool mode signal, separates the transmitter section 16 from the receiver section 20. The receiver section 20 comprises a plurality of receivers 22 axially spaced from the transmitter section 16. Six receivers are illustrated, although more or fewer receivers can be used. The receivers 22 are also shown axially aligned, although axial alignment is not required as will be discussed in a subsequent section of this disclosure.

Still referring to FIG. 1, the tool 10 can comprise other elements that can be used to complement measurements made with the acoustic transmitter section 16 and the receiver section 20. In the embodiment shown in FIG. 1, the tool comprises an optional directional section 24 that provides a real time measure of azimuthal angle therefore provides azimuthal orientation of the tool 10 within the borehole 44. The tool 10 can optionally comprise an auxiliary sensor section 14 with one or more auxiliary sensors responsive to a variety of borehole environs parameters. It should be understood that operation of the acoustic transmitter disclosed herein does not require measurements from the directional section 24 or from the auxiliary sensor section 14.

Once again referring to FIG. 1, an electronics section 26 provides power and control circuitry for the acoustic transmitter section 16, receiver section 20, the optional directional section 24, and any optional auxiliary sensors in the auxiliary sensor section 14. Power is typically supplied by batteries, but may be supplied by a mud powered turbine generator (not shown). The electronics section 26 is operationally connected to a down-hole telemetry unit 28. Data from elements within the tool 10, whether processed downhole as parameters of interest or in the form of "raw" data, are telemetered to the surface 46 of the earth by means of a suitable telemetry system. Suitable telemetry systems include a mud pulse system, and electromagnetic telemetry system, or an acoustic telemetry system that uses the drill string 32 as a data conduit. The telemetered data are received by an up-hole telemetry element (not shown) preferably disposed in a surface equipment module 38. As the borehole assembly comprising the logging tool 10 is conveyed along the borehole 44 by the drill string 32, one or more parameter of interest, or alternately raw data, are input to a recorder 40. The recorder 40 tabulates the data as a function of depth within the borehole 44 at which they are measured. The recorder output 42 is typically a "log" of the data as a function of borehole depth. The data can alternately be recorded in down-hole processor memory (not shown), and subsequently downloaded to the surface equipment module 38 when the tool 10 is returned to the surface 46 during or after the drilling operation is completed. The downloaded data are typically processed further within the surface equipment module 38 to obtain additional parameters of interest that cannot be determined in the down-hole processor unit.

As stated previously, the tool housing 11 is typically a steel drill collar with a conduit through which drilling fluid flows. Elements of the tool 10 illustrated conceptually in FIG. 1 are typically disposed within the wall of the drill collar pressure housing 11.

Embodiments of acoustic transmitters disclosed herein all comprise piezoelectric plate elements. A piezoelectric plate has three natural frequencies that are proportional to the three dimensions of the plate. A frequency in the desired range for acoustic logging typically corresponds to the longest dimension or "length" of the plate. This dimension is adjusted to obtain the desired frequency output for acoustic logging. Energy output in the form of a pressure pulse is proportional to the major surface of the piezoelectric plate. Frequency and acoustic energy outputs of a piezoelectric plate are, therefore, a function of plate dimensions, polarization and orientation. In order to obtain optimum frequency and acoustic energy outputs and still meet structural dimensional restrictions of a logging tool, it is desirable to combine or "stack" a plurality of piezoelectric plate elements thereby forming a plate assembly within a single acoustic transmitter. The elements of the plate assembly are activated simultaneously to emit energy in a common direction.

FIG. 2a is a cross-sectional view of a plate assembly 51 having piezoelectric plates 50 polarized in a "thickness mode" and in a side-by-side configuration. The assembly can contain more or fewer plates, but a plate assembly having an odd number of plates is preferred for simplicity in wiring. The plates 50 are axially and azimuthally aligned. Polarization of each plate is indicated at the top of the plate. The thickness mode plates are polarization and physically oriented and electrically connected so that they respond simultaneously to a voltage applied to the plate assembly and emit acoustic pressure in a common direction. This is accomplished by connecting all positive and negative polarization surfaces with common electrical busses 54 and 52, respectively. The length and thickness of the plate assembly 51 are indicated by the dimensions 55 and 53, respectively.

FIG. 2b is a perspective view of a single thickness mode plate 50 of length 55, width 55b and thickness 55c. A normal vector 50e to the major surface 50d is illustrated for future reference. Polarization is indicated by the appropriate arrows. Within the context of this disclosure, the major surface of a plate is parallel to the major surface of a plate assembly that contains the plate.

FIG. 3 illustrates a plate assembly 56 again comprising five bonded piezoelectric plates 50. Plate polarization is in the thickness mode and is again indicated at the top of each plate. In this plate configuration, the plates 50 are bonded with intervening layers of electrical conducting material 60. As in the side-by-side embodiment shown in FIG. 2a, the plates 50 are oriented and electrically connected so that they respond to an applied voltage and simultaneously emit acoustic energy in a common direction. The plates 50 are also axially and azimuthally aligned. This again is accomplished by connecting all positive and negative polarization surfaces with common electrical busses 54 and 52, respectively. The length 55 of the plate assembly 56 is the same as that for the assembly 51 shown in FIG. 2a. The thickness 53a of the assembly 56 has, however, been reduced using the bonding embodiment. The reduced thickness is advantageous in meeting the previously mentioned physical restrictions imposed by LWD applications.

It is preferred to operate the transmitter in a predetermined center frequency range suitable for acoustic logging applications. A plate can be polarized along the thickness or along the length, with "length" and "thickness" being defined in FIG. 2b. If polarized along the thickness 55c, the desired length mode frequency is obtained through shrinkage in plate length 55 as the thickness expands. This is not an efficient methodology for obtaining length mode output. If the plate is polarized in the length mode, the desired frequency is obtained through the primary length mode. However, since it is relatively difficult to polarize a piezoelectric plate long plate along its length 55, a "striped" plate may be used to obtain higher efficiency than that obtainable with a thickness mode plate.

A striped plate 62 is shown in FIG. 4, and comprises a plurality of piezoelectric segments 64 or piezoelectric "stripes" disposed on a solid piece of piezoelectric plate 67 and separated by electrical conducting material 65. Polarization of each segment 64 is illustrated. The plates 50 are oriented and electrically connected so that they respond simultaneously to a voltage applied to the plate assembly and emit acoustic energy in a common direction. This again is accomplished by connecting all positive and all negative polarization surfaces with common electrical busses 68 and 70, respectively. Output frequency can be adjusted by varying the dimensions of the piezoelectric segments 64.

As discussed previously, a striped plate 62 as shown in FIG. 4 may be used to obtain greater output efficiency than that of a thickness mode plate of the type illustrated in FIG. 2b. Although offering this advantage, the striped plate 62 has some disadvantages compared to a solid thickness mode plate. The output of a thickness mode plate 50 is inversely proportional to its thickness while the output of a striped plate 62 is a function of the stripe thickness and number of stripes. If the thickness of each plate is minimized to utilize more plates in a single plate assembly, the thickness mode plates may produce higher output than striped plates for a given assembly thickness. Furthermore, it is easier to bond solid plates, of the type shown in FIGS. 2b and 3, along their faces than bonding striped plates 62 along the piezoelectric stripes 64 (see FIG. 4). Finally, the signal directionality of a thickness mode plate 50 is perpendicular to the face 50d of the plate, which may be more suitable for LWD applications. To summarize, plate geometries and polarizations offer certain advantages and disadvantages that must be weighed in considering the overall performance objectives of the acoustic transmitter.

FIG. 5 is a cross-sectional view of the transmitter section 16 (see FIG. 1) illustrating a transmitter 86 disposed therein.

The transmitter 86 comprises a plate assembly 88 having preferably a plurality of piezoelectric plates in the side-by-side, bonded, or striped embodiments previously discussed. The piezoelectric plates within the illustrated plate assembly 88 are axially and azimuthally aligned. The plate assembly 88 is housed in a pressure housing 84 that is preferably filled with oil and is pressure and temperature balanced. The plurality of plates contained in the transmitter 86 is disposed within a recess (defined by the surfaces 83) in the outer surface of the wall 89 of the transmitter section 16 of the tool 10. A cover 90 protects the pressure housing from abrasion encountered in the borehole environment. The transmitter 86 is oriented so that the radius of the tool 10 is coincident with the normal of the plate assembly 88, which is the same as the normal of a given plate (see 50e in FIG. 2b). Openings 85a and 85b are typically filled with borehole fluid, which acoustically couples the transmitter 86 to the borehole environs. The axial centerline of the transmitter is shown at 96, and will be referenced in a subsequent discussion.

Again referring to FIG. 5, the transmitter section 16 of a typical LWD tool 10 is typically a steel drill collar comprising a wall 89 and a conduit 87 through which drilling fluid flows. The transmitter section 16 has an outer diameter of about 7 inches (17.8 centimeters) and a wall thickness of less than 3 inches (7.6 centimeters). For structural reasons, it is necessary to restrict the depth of the recess housing the transmitter 86 to a depth of less than half of the wall thickness, to restrict the azimuthal arc of the recess to 2 inches (5.1 centimeters) or less, and to restrict the axial length of the recess to 6 inches (15.2 centimeters) or less. These structural based recess restrictions set the maximum dimensions of a transmitter that can disposed within the wall of an LWD tool and, therefore, affect the energy and frequency outputs of the transmitter 86. Stated another way, physical restrictions on the recess housing the transmitter 86 affect the frequency and energy outputs of the transmitter.

The plate assembly 88 is disposed in the recess in an outer surface of the logging tool such that the radius of the logging tool is essentially normal to a major surface of the plate assembly. As discussed previously, individual plates are polarized and configured to emit a pressure pulse in a common direction normal to major surface of the plate assembly upon application of a voltage to the plate assembly.

Depending on the piezoelectric material, a plate assembly comprising a plurality of plates each with a length of 4.5 inch (11.4 centimeters) has a natural frequency of 11-13 KHz in the length mode, which is ideal for monopole acoustic logging measurements. The thickness mode frequency of a 0.125 inches (0.32 centimeters) thick plate is in the megahertz range and does not penetrate far from the transmitter 86. Therefore, in a LWD tool in a borehole environment, the thickness mode of the plate within a plate assembly has no effect on the measurement made from the length mode. A plate with a width of 1.5 inches (3.8 centimeters) has a frequency in the range of 32 to 38 KHz in the width mode. In order for this frequency not to interfere with the length mode frequency, the width of plates within a plate assembly should be kept at a maximum of 1.5 inches (3.8 centimeters).

The pressure output of a single 4.5 inch (length)×1.25 inch (width)×0.125 inch (thick) piezoelectric plate has been found to be approximately 200 Pascal at an input voltage of +500 volts at 39.4 inches (1.0 meter). Again referring to FIG. 5, the desired pressure output of a transmitter 86 used in an acoustic logging tool 10 is in the range of 1000-2000 Pascal. Therefore, a plate assembly 88 of eight to ten plates should produce a pressure output in the desired range for logging applications. An odd number of nine plates would be preferred for the previously mentioned ease of wiring. Considering the individual plate dimensions above required for the desired frequency output, a plate assembly 88 comprising a stack of nine plates requires a recess of depth that exceeds previously discussed physical restrictions for a typical drill collar.

The desired monopole pressure pulse output at the desired predetermined frequency can be obtained using two transmitters with each comprising plate assemblies of preferably five plates with dimensions defined above. FIG. 6 is a cross-sectional view of the transmitter section 16 showing two transmitters 86a and 86b disposed in two axially aligned dedicated recesses 83a and 83b, respectively, in the outer surface. Both transmitters are operated simultaneously so that all eight plates emit acoustic pressure pulses of the same polarity into the surrounding borehole environs. Since each transmitter preferably comprises only five plates, the depths of the recesses 83a and 83b do not exceed the physical restrictions of the drill collar. Both transmitters 86a and 86b are protected from abrasion by covers 90a and 90b, respectively, and are acoustically coupled to the borehole environs through opening of the type depicted at 85a and 85b of FIG. 5. Given the closeness of the azimuthal separation between the two transmitters 88a and 88b, the two transmitters respond as a monopole transmitter and the arrival of acoustic energy at the receiver section 20 is not excessively broadened or phase shifted.

FIG. 7 conceptually illustrates the axial distribution of the intensity of the pressure output signal from the transmitter 86 depicted in FIG. 5. The direction of the pressure signal is from the length mode of a plate assembly comprising a plurality of plates of 4 inches (10.2 centimeters) in length oriented along the Z axis, which is the major axis of the transmitter section 16 of the tool 10. The plates are axially and azimuthally aligned. Curve 92 represents acoustic pressure intensity as a function of position along the Z axis. The axial centerline 96 defines the axial center of the transmitter 86 shown in FIG. 5. There are two pronounced lobes 94a and 94b corresponding to the top and bottom, respectively, of the transmitter 86. This can lead to phase shift and signal distortion since waves emitted from each end of the transmitter 86 arrive at the receivers 22 of the receiver section 20 (see FIG. 1) at slightly different times. In practice, however, the signal of the transmitter 86 is "smeared out" when it is mounted within the wall 89 of the transmitter section 16. If the axial dimension of a plate assembly 88 that can be used in logging tools is a maximum length of 5 inches (12.7 centimeters), the effects of the two-lobe pressure emission patter are negligible in fast and medium velocity formations penetrated by the borehole. The two-lobe pressure emission could, however, be noticeable in slow formations. It is noted that the lobes are also approximately axially coincident with the opening 85a and 85b, respectively, shown in FIG. 5. The two lobes can cause difficulties in that energy from each lobe arrives at a different time at the receiver section 20 thereby resulting in a phase shift (see FIG. 1). The two lobed pressure beam pattern from the transmitter 86 is not as efficient as the radiation pattern from the hypothetical compression transmitter yielding a single lobe. The transmitter 86 comprising preferably a plurality of plates can, however, still be used as an acoustic source as long as the top and bottom of the transmitter is acoustically coupled through openings 85a and 85b to the borehole fluid thereby allowing the pressure wave to propagate into the formation. The axial extent of each opening 85a and 85b should be sufficiently long to encompass the majority of the signal in the two lobes 94a and 94b. It has been determined that openings of axial extent of approximately 1.5 inches (3.8 centimeters) above and below the plate assembly 88 meet this criterion.

An ideal transmitter output would be a single lobe preferably centered at the axial center 96 of the transmitter. The adverse effects of the double lobed signal can be minimized by redistributing the signal of a transmitter 86 to approach a single lobe emission. Three techniques for signal redistribution are discussed below.

A first technique of redistributing the double lobed pressure output signal would be to dispose the entire transmitter 86 in a heavy mass thereby smearing pressure output pattern at the transmitter. Enclosing the transmitter 86 in a heavy mass body has been shown to smear out the signal even in the slowest formations. However, the housing may cause frequency changes and may attenuate the signal. Therefore, the material and thickness of the housing are chosen so that signal attenuation and frequency changes are kept at a minimum.

A second technique for essentially eliminating the double lobe pressure signal output is to use a transmitter comprising a plurality of azimuthally aligned but axially staggered piezoelectric plates. The staggered plate concept is illustrated in the cross-sectional view of FIG. 8 showing a plate assembly 98 comprising six plates 50, where each plate is 4 inch (10.2 centimeters) in length. The plates 50 are axially staggered in a pressure housing (not shown) in 0.5 inch (1.3 centimeters) increments. The axial centerline of the staggered plate assembly 98 is shown at 95. FIG. 9 conceptually illustrates the intensity of the axial pressure output signal from a transmitter using the staggered plate assembly 98. Again, the direction of the pressure signal is from the length mode of the plate assembly oriented along the Z axis, which is the major axis of the transmitter section 16 of the tool 10. Curve 99 represents acoustic pressure intensity as a function of position along the Z axis. The axial centerline 95 defines the axial center of the transmitter shown in FIG. 8. The response curve 99 of the staggered assembly 98 has a much smoother shape than that of the axially aligned plate assembly shown in FIG. 7. The response curve 99 assumes an exponential attenuation in the radial direction from each plate 50. As a result, the center 95a of the response curve 99 falls slightly below the axial 95. The absence of the double lobed response curve eliminates some to the related problem discussed above. Staggering of the plate has, however, increased the length of the transmitter by 2 inches (5.1 centimeters) thereby requiring an axially elongated recess to receive the transmitter and, in turn, imposing additional physical restrictions on the logging tool housing. As in many logging methodologies, a compromise between transmitter length and signal distribution must be made to achieve the best measurement for a certain tool design.

A third technique is to place shields over the two lobes, which would focus the signal at the center of the plate. Experimental measurements and numerical modeling show that shielding the top and bottom 1.0 inch (2.5 centimeters) of a 4 inch (5.1 centimeters) long plate results in focusing the pressure wave toward the center line of the plate.

As mentioned previously, the transmitter is disclosed as a monopole transmitter. It should be understood that two transmitter assemblies can be azimuthally disposed, at essentially 180 degree centers, in dedicated recesses in the outer surface of the wall 89 of the transmitter section 16. The transmitter assemblies are preferably axially aligned and operated to generate dipole acoustic pulses within the borehole environs. Similarly, four transmitter assemblies can be azimuthally disposed, at essentially 90 degree centers, in dedicated recesses in the outer surface of the wall 89 of the transmitter section 16. The transmitter assemblies are preferably axially aligned and operated to generate quadrupole acoustic pulses within the borehole environs. Embodied as a dipole or quadrupole transmitter section, the transmitter assemblies are preferably axially aligned. Furthermore, responses from pulses generated by each azimuthal transmitter assembly are preferably detected with multiple receivers 22 (see FIG. 1) that are axially spaced from and azimuthally aligned with that transmitter assembly.

The above disclosure is to be regarded as illustrative and not restrictive, and the invention is limited only by the claims that follow.

What is claimed is:

1. A logging tool acoustic transmitter comprising a plurality of piezoelectric plates; wherein
    (a) each said plate is disposed within a wall of said logging tool such that a single radius of said logging tool is essentially normal to a major surface of said each plate;
    (b) said plates are polarized and configured physically and electrically to emit a pressure pulse from each said plate in a common direction normal to said major surface upon application of a voltage to said plurality of plates; and
    (c) said plates are axially staggered.

2. The transmitter of claim 1 further comprising a plate assembly comprising said plurality of said plates wherein said plate assembly is disposed in a recess in an outer surface defining said wall of said logging tool such that the radius of said logging tool is essentially normal to a major surface of said plate assembly.

3. The transmitter of claim 2 further comprising a plurality of plate assemblies wherein each said plate assembly is axially aligned and azimuthally displaced and each is disposed in a dedicated recess in said outer surface defining said wall of said logging tool.

4. The transmitter of claim 3 comprising two plate assemblies that are azimuthally displaced at essentially 180 degrees and operated to generate dipole acoustic pulses.

5. The transmitter of claim 3 comprising four plate assemblies that are azimuthally displaced essentially 90 degrees and operated to generate quadrupole acoustic pulses.

6. The transmitter of claim 2 wherein said plate assembly is disposed within a pressure housing that is disposed within said recess.

7. The transmitter of claim 2 wherein said plates are bonded with intervening layers of conducting material.

8. The transmitter of claim 1 wherein said plates are dimensioned to obtain a predetermined center frequency output.

9. The transmitter of claim 1 wherein said plates are polarized in a thickness mode.

10. The transmitter of claim 1 wherein said plates are configured as striped plates.

11. A method for emitting a pressure pulses into a borehole, the method comprising:
    (a) disposing within said borehole a logging tool comprising a plurality of piezoelectric plates;
    (b) disposing each said plate in a wall of said logging tool such that a single radius of said logging tool is essentially normal to a major surface of each said plate;
    (c) polarizing and configuring physically and electrically said plates to emit said pressure pulse in a common direction normal to said major surfaces upon application of a voltage to said plurality of plates; and
    (d) axially staggering said plates with respect to a centerline of said plate assembly.

12. The method of claim 11 further comprising:
    (a) forming a plate assembly comprising a plurality of said plates; and
    (b) disposing said plate assembly in a recess in an outer surface defining said wall of said logging tool such that the radius of said logging tool is essentially normal to a major surface of said plate assembly.

13. The method of claim 12 further comprising disposing a plurality of said plate assemblies in said wall of said logging tool wherein each said plate assembly is axially aligned and azimuthally displaced and each disposed in a dedicated recess in said outer surface defining said wall of said logging tool.

14. The method of claim 13 further comprising:
   (a) disposing two plate assemblies in said wall of said logging tool wherein said plate assemblies are azimuthally displaced at essentially 180 degrees; and
   (b) operating said two plate assemblies to generate a dipole acoustic pulse.

15. The method of claim 13 further comprising:
   (a) disposing four plate assemblies in said wall of said logging tool wherein said plate assemblies are azimuthally displaced at essentially 90 degrees; and
   (b) operating said four plate assemblies to generate a quadrupole acoustic pulse.

16. The method of claim 11 further comprising disposing said plate assembly within a pressure housing that is disposed within said recess.

17. The method of claim 12 further comprising bonding said plates with intervening layers of conducting material.

18. The method of claim 11 further comprising dimensioning said plates to obtain a predetermined center frequency output from said plate.

19. The method of claim 11 further comprising polarizing said plates in a thickness mode.

20. The method of claim 11 further comprising configuring said plates as striped plates.

21. A logging tool acoustic transmitter comprising two or more stacked piezoelectric plates; wherein
   (a) said stacked plates are disposed within a wall of said logging tool such that a single radius of said logging tool is essentially normal to a major surface of said stacked plates;
   (b) said stacked plates are polarized and configured physically and electrically to emit a pressure pulse from each said plate in a common direction normal to said major surface upon application of a voltage to said at least one plate; and
   (c) said plates are axially staggered with respect to a centerline of said stacked plates.

22. A method for emitting a pressure pulses into a borehole, the method comprising:
   (a) disposing within said borehole a logging tool comprising two or more stacked piezoelectric plates;
   (b) disposing said stacked plates in a wall of said logging tool such that a single radius of said logging tool is essentially normal to a major surface of said stacked plates;
   (c) polarizing and configuring physically and electrically said stacked plates to emit said pressure pulse in a common direction normal to said major surfaces upon application of a voltage to said at least one plate; and
   (d) wherein said plates are axially staggered with respect to a centerline of said stacked plates.

* * * * *